US012786647B2

(12) United States Patent
Kim et al.

(10) Patent No.: US 12,786,647 B2
(45) Date of Patent: Nov. 3, 2026

(54) DEVICE AND METHOD FOR CONTROLLING VIRTUAL ENGINE SOUND

(71) Applicants: HYUNDAI MOTOR COMPANY, Seoul (KR); Kia Corporation, Seoul (KR)

(72) Inventors: Dae Hyun Kim, Bucheon-si (KR); Seung Woo Kim, Anyang-si (KR); Dong Geon Lee, Mungyeong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 675 days.

(21) Appl. No.: 18/115,869

(22) Filed: Mar. 1, 2023

(65) Prior Publication Data

US 2024/0056752 A1 Feb. 15, 2024

(30) Foreign Application Priority Data

Aug. 9, 2022 (KR) ........................ 10-2022-0099321

(51) Int. Cl.

| | |
|---|---|
| ***H04R 29/00*** | (2006.01) |
| ***G07C 5/08*** | (2006.01) |
| ***G08B 21/18*** | (2006.01) |
| ***H04L 12/40*** | (2006.01) |

(52) U.S. Cl.

CPC ......... *H04R 29/002* (2013.01); *G07C 5/0825* (2013.01); *G08B 21/182* (2013.01); *H04L 12/40032* (2013.01); *H04L 2012/40215* (2013.01)

(58) Field of Classification Search

CPC .. H04R 29/002; G07C 5/0825; G08B 21/182; H04L 12/40032; H04L 2012/40215

See application file for complete search history.

(56) References Cited

U.S. PATENT DOCUMENTS

| | | | | |
|---|---|---|---|---|
| 9,987,982 B2 | 6/2018 | Sun et al. | | |
| 12,244,281 B2 * | 3/2025 | Lee | G06F 16/65 | |
| 2008/0291034 A1 * | 11/2008 | Kernwein | B60Q 5/00 | 340/626 |
| 2011/0085674 A1 * | 4/2011 | Fujikawa | G10K 15/02 | 381/86 |
| 2013/0114827 A1 * | 5/2013 | Lee | B60Q 5/008 | 381/86 |

(Continued)

FOREIGN PATENT DOCUMENTS

| | | |
|---|---|---|
| JP | 5538662 B2 | 7/2014 |
| KR | 10-1547938 B1 | 8/2015 |

OTHER PUBLICATIONS

Office Action issued in corresponding Korean Application No. 10-2022-0099321 dated Jun. 19, 2026, with English translation.

*Primary Examiner* — Erin M Piateski

(74) *Attorney, Agent, or Firm* — MORGAN, LEWIS & BOCKIUS LLP

(57) ABSTRACT

A device for controlling a virtual engine sound includes a sensor for sensing a state of a vehicle, one or more sound output devices for outputting a virtual engine sound corresponding to the state of the vehicle, and a controller that measures a plurality of currents respectively output from the one or more sound output devices, and determines operating states of the one or more sound output devices based on the measured plurality of current values.

18 Claims, 10 Drawing Sheets

(56) References Cited

U.S. PATENT DOCUMENTS

| | | | | |
|---|---|---|---|---|
| 2014/0287835 | A1* | 9/2014 | Kim | A63F 13/355<br>463/35 |
| 2015/0151680 | A1* | 6/2015 | Park | B60Q 5/008<br>381/86 |
| 2017/0043713 | A1 | 2/2017 | Sun et al. | |
| 2019/0111839 | A1* | 4/2019 | Lee | G06N 20/00 |
| 2019/0385584 | A1* | 12/2019 | Han | G10K 11/17823 |
| 2020/0296514 | A1 | 9/2020 | Harris et al. | |
| 2021/0306790 | A1* | 9/2021 | Noguchi | H04R 1/323 |
| 2022/0089085 | A1* | 3/2022 | Oh | B60Q 5/008 |
| 2022/0194410 | A1* | 6/2022 | Kim | B60W 50/16 |
| 2022/0266747 | A1* | 8/2022 | Kim | B60R 19/48 |
| 2022/0266748 | A1* | 8/2022 | Kim | B60Q 5/008 |
| 2023/0016272 | A1* | 1/2023 | Kim | B60W 40/09 |
| 2023/0311674 | A1* | 10/2023 | Yokoyama | B60L 53/12<br>701/22 |
| 2024/0169970 | A1* | 5/2024 | Lee | G10K 15/02 |
| 2024/0196153 | A1* | 6/2024 | Lee | H04R 1/403 |
| 2024/0198902 | A1* | 6/2024 | Lee | G10K 15/02 |
| 2025/0058649 | A1* | 2/2025 | Cho | B60K 35/21 |

* cited by examiner

DEVICE AND METHOD FOR CONTROLLING VIRTUAL ENGINE SOUND

CROSS-REFERENCE TO RELATED APPLICATION

This application claims the benefit of priority to Korean Patent Application No. 10-2022-0099321, filed in the Korean Intellectual Property Office on Aug. 9, 2022, the entire contents of which are incorporated herein by reference.

TECHNICAL FIELD

The present disclosure relates to a device and a method for controlling a virtual engine sound.

BACKGROUND

Recently, a technology for generating a virtual engine sound in an eco-friendly vehicle has been developed. In general, at least one control device for generating the virtual engine sound is disposed in a vehicle. Each control device has a limitation in causing a sense of heterogeneity by causing an engine sound output timing problem. In addition, CAN communication and a diagnostic algorithm are required to diagnose a state of each control device, so that there is a limitation that a cost and a CAN bus load are increased.

Therefore, there is a demand for development of a technology that may, when outputting the virtual engine sound, minimize the sense of heterogeneity of the sound output while reducing the cost.

SUMMARY

The present disclosure has been made to solve the above-mentioned problems occurring in the prior art while advantages achieved by the prior art are maintained intact.

An aspect of the present disclosure provides a device and a method for controlling a virtual engine sound that may minimize a sense of heterogeneity of sound output and reduce a cost when generating the virtual engine sound.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for controlling a virtual engine sound includes a sensor for sensing a state of a vehicle, one or more sound output devices for outputting a virtual engine sound corresponding to the state of the vehicle, and a controller that measures a plurality of currents respectively output from the one or more sound output devices, and determines operating states of the one or more sound output devices based on the measured plurality of current values.

In one implementation, the controller may determine whether the plurality of current values measured during a predetermined duration have reached a preset maximum value.

In one implementation, in response to determination that a current value among the plurality of current values measured during the predetermined duration has not reached the preset maximum value, the controller may determine that a sound output device of the one or more sound output devices where the current value that has not reached the maximum value is measured is in a failure state.

In one implementation, the controller may output an image indicating that the sound output device is in the failure state on a display device.

In one implementation, in response to determination that the plurality of current values measured during the predetermined duration have reached the preset maximum value, the controller may compare the plurality of current values with each other at each measurement time point, and determine whether the plurality of current values are equal to each other at each measurement time point.

In one implementation, in response to determination that the plurality of current values are not equal to each other at each measurement time point, the controller may determine a sound output device among the one or more sound output devices having a first current value with a waveform of one cycle repeated as a reference sound output device, and determine that at least one sound output device of the one or more sound output devices having a measured current value different from the first current value of the reference sound output device is in an error state.

In one implementation, in response to determination that the plurality of current values are not equal to each other at each measurement time point, the controller may store a first time point when the plurality of current values are not equal to each other, and at least one current value measured at the first time point of the at least one sound output device in the error state.

In one implementation, the controller may control the at least one current value measured at the first time point to be output to the at least one sound output device in the error state from the first time point to a second time point, wherein a second current value of the reference sound output device measured at the second time point becomes equal to the at least one current value measured at the first time point of the at least one sound output device.

In one implementation, in response to determination that the plurality of current values are equal to each other at each measurement time point, the controller may determine that the one or more sound output devices are in a normal state.

According to another aspect of the present disclosure, a method for controlling a virtual engine sound includes measuring a plurality of currents output from one or more sound output devices, and determining operating states of the one or more sound output devices based on the measured plurality of current values.

In one implementation, the method may further include determining whether the plurality of current values measured during a predetermined duration have reached a preset maximum value.

In one implementation, the method may further include, in response to determination that a current value among the plurality of current values measured during the predetermined duration has not reached the preset maximum value, determining that a sound output device of the one or more sound output devices where the current value that has not reached the maximum value is measured is in a failure state.

In one implementation, the method may further include outputting an image indicating that the sound output device is in the failure state on a display device.

In one implementation, the method may further include, in response to determination that the plurality of current values measured during the predetermined duration have reached the preset maximum value, comparing the plurality of current values with each other at each measurement time point, and determining whether the plurality of current values are equal to each other at each measurement time point.

In one implementation, the method may further include, in response to determination that the plurality of current values are not equal to each other at each measurement time point, determining a sound output device among the one or more sound output devices having a first current value with a waveform of one cycle repeated as a reference sound output device, and determining that at least one sound output device of the one or more sound output devices having a measured current value different from the current value of the reference sound output device is in an error state.

In one implementation, the method may further include, in response to determination that the plurality of current values are not equal to each other at each measurement time point, storing a first time point when the plurality of current values are not equal to each other, and at least one current value measured at the first time point of the at least one sound output device determined to be in the error state.

In one implementation, the method may further include, controlling the at least one current value measured at the first time point to be output to the at least one sound output device in the error state from the first time point to a second time point, a second current value of the reference sound output device measured at the second time point becomes equal to the at least one current value measured at the first time point of the at least one sound output device.

In one implementation, the method may further include, in response to determination that the plurality of current values of the sound output devices are equal to each other at each measurement time point, determining that the one or more sound output devices are in a normal state.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
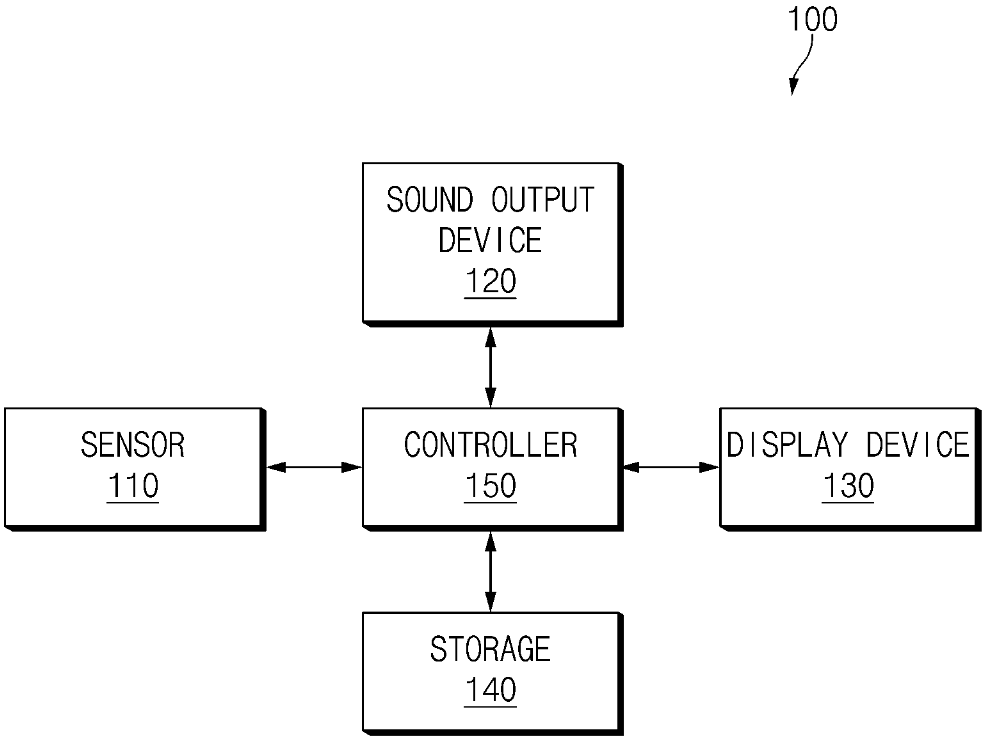
FIG. 1 is a view illustrating a configuration of a virtual engine sound control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific tams used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view illustrating a configuration of a virtual engine sound control device according to an embodiment of the present disclosure.

As shown in FIG. 1, a virtual engine sound control device 100 may include a sensor 110, a sound output device 120, a display device 130, storage 140, and a controller 150.

The sensor 110 may sense a state of a vehicle. According to an embodiment of the present disclosure, the sensor 110 may sense the state of the vehicle to generate a virtual engine sound corresponding to the state of the vehicle. According to an embodiment, the state of the vehicle may include a speed of the vehicle, a gear state of the vehicle, a brake pedal pressed state, and the like. To this end, the sensor 110 may include a speed sensor, a gear detection sensor, a brake pedal sensor, and the like.

The sound output device 120 may output the virtual engine sound generated by the controller 150. According to an embodiment of the present disclosure, the one or more sound output devices 120 may be disposed in the vehicle to optimally output the virtual engine sound to the outside of the vehicle. The sound output device 120 may be implemented as a speaker having a built-in voice coil.

The display device 130 may output an image under control of the controller 150. The display device 130 may be disposed in a cluster of the vehicle or may be implemented integrally with a navigation system. The display device 130 may be implemented as a display device employing a liquid crystal display (LCD) panel, a light emitting diode (LED) panel, an organic light emitting diode (OLED) panel, a plasma display panel (PDP), or the like. The liquid crystal display may include a thin film transistor-LCD (TFT-LCD).

The storage 140 may store at least one algorithm for performing operation or execution of various commands for an operation of the virtual engine sound control device according to an embodiment of the present disclosure. The storage 140 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 150 may be implemented by various processing devices, such as a microprocessor with a built-in semiconductor chip capable of performing the operation or the execution of the various commands, and may control the operation of the virtual engine sound control device according to an embodiment of the present disclosure. The controller 150 may be electrically connected to the sensor 110, the sound output device 120, the display device 130, and the storage 140 via a wired cable or various circuits to transmit an electrical signal including a control command, and may transmit/receive the electrical signal including the control command and the like via various wireless communication networks such as a controller area network (CAN).

The controller 150 may generate the virtual engine sound corresponding to the state of the vehicle sensed by the sensor 110, and control the virtual engine sound to be output via the one or more sound output devices 120.

The controller 150 may measure a current of the voice coil in the one or more sound output devices 120. According to an embodiment of the present disclosure, the one or more sound output devices 120 may include a first sound output device 121 and a second sound output device 122. A more detailed description will be made with reference to FIG. 2.

Figure 2:
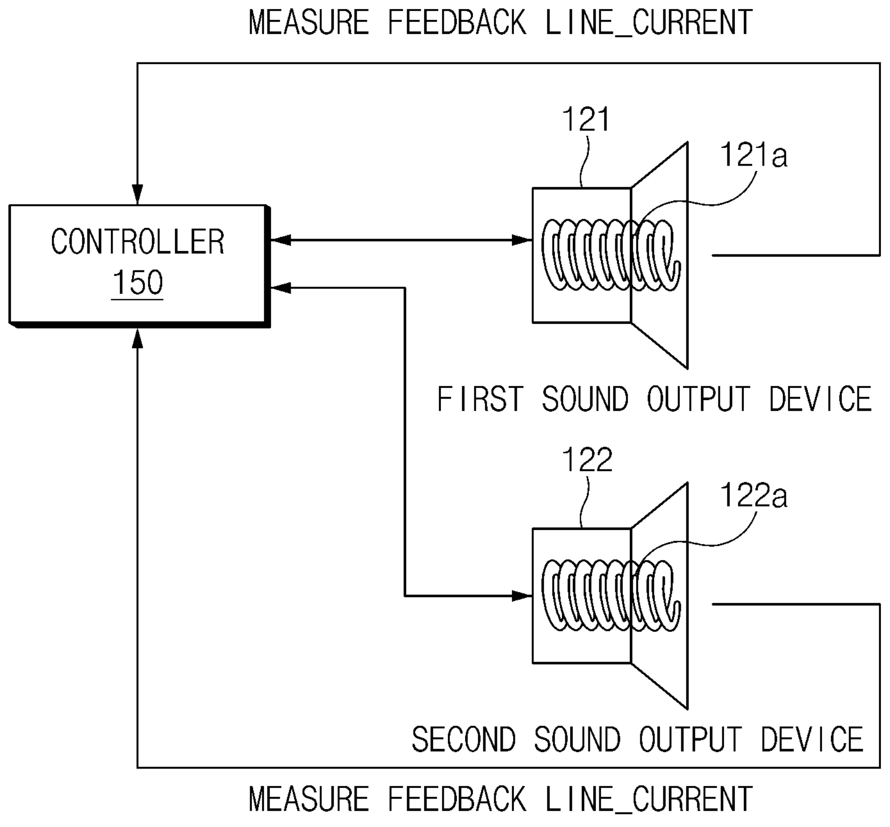
FIG. 2 is a view schematically illustrating a virtual engine sound control device according to an embodiment of the present disclosure.

FIG. 2 is a view schematically illustrating a virtual engine sound control device according to an embodiment of the present disclosure.

As shown in FIG. 2, the controller 150 may measure a current output from a first voice coil 121*a* included in the first sound output device 121 and a current output from a second voice coil 122*a* included in the second sound output device 122. According to an embodiment, the controller 150 may measure the currents via feedback lines disposed independently of the first voice coil 121*a* and the second voice coil 122*a*, respectively.

The controller 150 may measure the currents of the respective voice coils in the one or more sound output devices, and determine operating states of the one or more sound output devices based on the plurality of measured current values.

The controller 150 may measure the plurality of current values during a predetermined duration, and may determine whether the measured plurality of current values have reached a preset maximum value. According to an embodiment, the controller 150 may determine whether each of the current value output from the first voice coil 121*a* and the current value output from the second voice coil 122*a* has reached the preset maximum value during the predetermined duration.

When determining that each of the current value output from the first voice coil 121*a* and the current value output from the second voice coil 122*a* has reached the preset maximum value during the predetermined duration, the controller 150 may compare the current values with each other at each measurement time point. A more detailed description will be made with reference to FIGS. 3 and 4.

Figure 3:
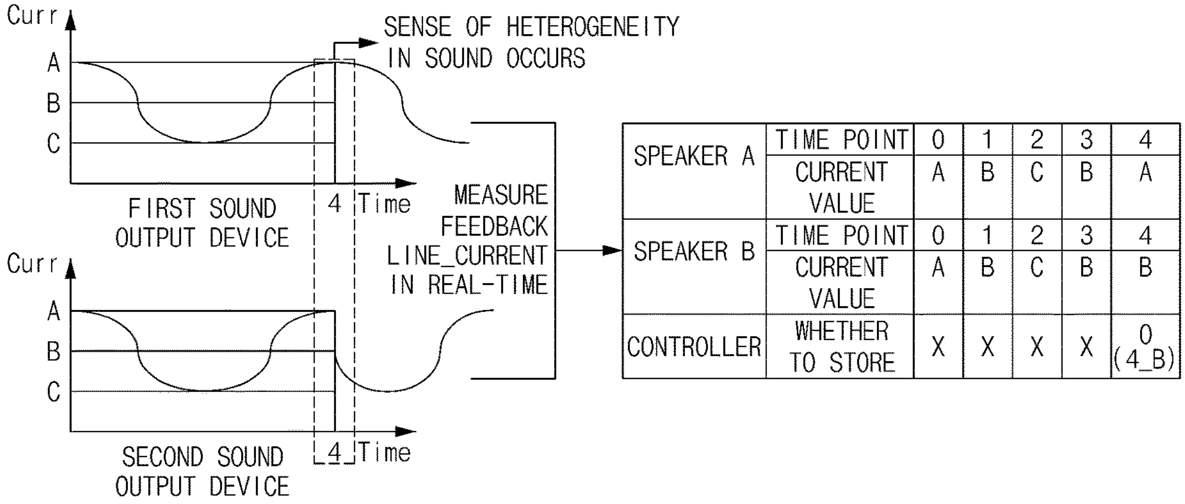
FIGS. 3 and 4 are views illustrating a current control scheme of a virtual engine sound control device according to an embodiment of the present disclosure.
Figure 4:
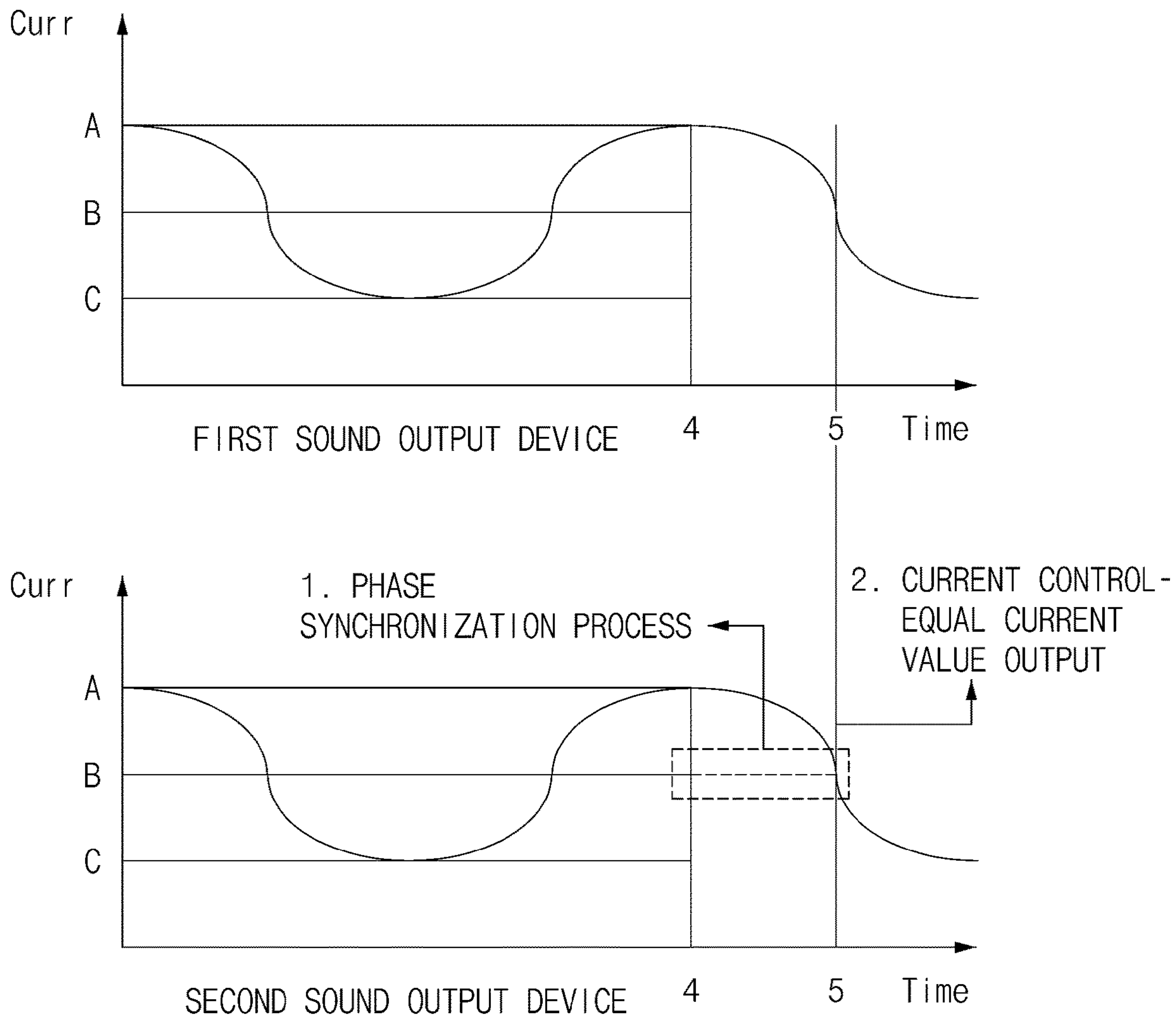

FIGS. 3 and 4 are views illustrating a current control scheme of a virtual engine sound control device according to an embodiment of the present disclosure.

As shown in FIG. 3, the controller 150 may measure the current value output from the first voice coil 121*a* of the first sound output device 121 and the current value output from the second voice coil 122*a* of the second sound output device 122 in real time, and compare the current values with each other.

The controller 150 may determine that a current value output from the first voice coil 121*a* of the first sound output device 121 and the current value output from the second voice coil 122*a* of the second sound output device 122 at each of a zeroth time point, a first time point, a second time point, and a third time point are equal to each other, and may determine that a current value output from the first voice coil 121*a* of the first sound output device 121 and a current value output from the second voice coil 122*a* of the second sound output device 122 at a fourth time point are not equal to each other.

When determining that the current value measured from the first voice coil 121*a* of the first sound output device 121 and the current value measured from the second voice coil 122*a* of the second sound output device 122 at each measurement time point are equal to each other, the controller 150 may determine that the first sound output device 121 and the second sound output device 122 are in a normal state.

When determining that the first sound output device 121 and the second sound output device 122 are in the normal state, the controller 150 may control the measurement time point and the current values not to be separately stored. Therefore, according to an embodiment, the controller 150 does not separately store the zeroth time point, the first time point, the second time point, and the third time point, and the current values of the first voice coil 121*a* of the first sound output device 121 and the current values of the second voice coil 122*a* of the second sound output device 122 measured at the zeroth time point, the first time point, the second time point, and the third time point.

When determining that the current value measured from the first voice coil 121*a* of the first sound output device 121 and the current value measured from the second voice coil 122*a* of the second sound output device 122 at each measurement time point are not equal to each other, the controller 150 may control the measurement time point and the current values to be separately stored. Accordingly, the controller 150 may store the fourth time point, and the current value of the second voice coil 122*a* of the second sound output device 122 measured at the fourth time point in the storage 140.

When the current value measured from the first voice coil 121*a* of the first sound output device 121 and the current value measured from the second voice coil 122*a* of the second sound output device 122 at each measurement time point are not equal to each other as described above, a user may feel a sense of heterogeneity in the output sound. Accordingly, the controller 150 may determine a sound output device in which an error has occurred among the one or more sound output devices.

According to an embodiment, the controller 150 may determine a sound output device having a current value in which a waveform of one cycle is repeated as a reference sound output device, and may determine that a sound output device from which a current value different from the current value of the reference sound output device is measured is in an error state.

According to an embodiment of the present disclosure, the controller 150 may determine that the current value measured from the first sound output device 121 has a phase in which a waveform of one cycle is repeated, thereby determining the first sound output device 121 as the reference sound output device. In addition, because the current value measured from the second sound output device 122 is different from the current value measured from the first sound output device 121 at the fourth time point, the controller 150 may determine that the second sound output device 122 is in the error state.

The controller 150 may control the current of the second sound output device 122 determined to be in the error state. According to an embodiment, as shown in FIG. 4, the controller 150 may control a current value B of the fourth time point to be output via the second sound output device 122 from a time point (the fourth time point) at which it is determined that the current value measured from the first sound output device 121 is not equal to the current value measured from the second sound output device 122 to a time point (a fifth time point) at which the current value of the reference sound output device becomes equal to the current value B of the fourth time point.

That is, the controller 150 may control the current value B of the fourth time point to be output via the second sound output device 122 from the fourth time point to the fifth time point such that a phase of the current measured from the second sound output device 122 and a phase of the current measured from the first sound output device 121 become equal to each other at the fifth time point. According to an embodiment, the controller 150 may control the current of the second sound output device 122 as shown in Table 1.

TABLE 1

| | | | | | | | |
|---|---|---|---|---|---|---|---|
| First sound output device | Time point | 0 | 1 | 2 | 3 | 4 | 5 |
| | Current value | A | B | C | B | A | B |
| Second sound output device | Time point | 0 | 1 | 2 | 3 | 4 | 5 |
| | Current value | A | B | C | B | B | B (re-output) |
| Controller | Storage | Not stored | Not stored | Not stored | Not stored | Fourth time point, current value B | Not stored |

Figure 5:
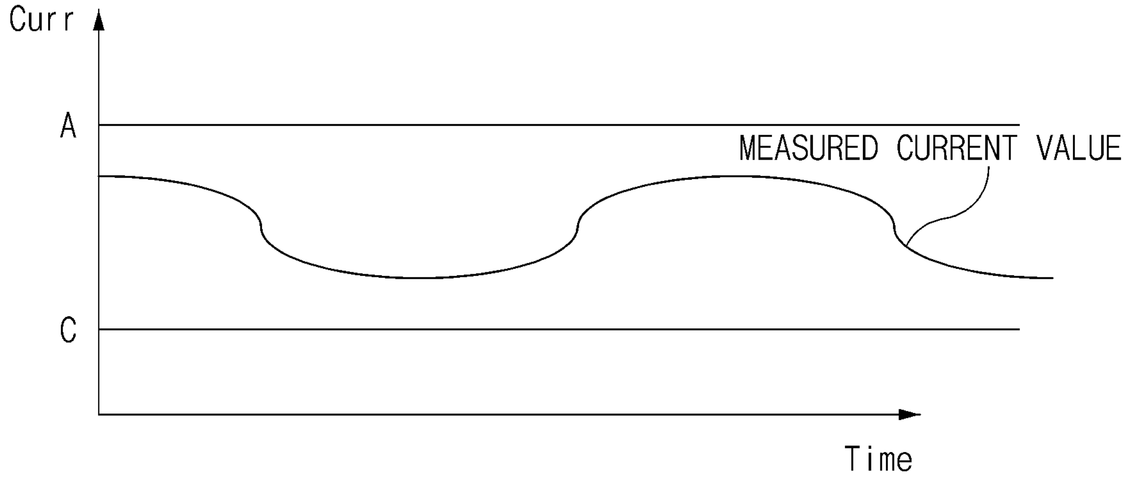
FIGS. 5 and 6 are graphs illustrating a current when a failure occurs in a virtual engine sound control device according to an embodiment of the present disclosure.
Figure 6:
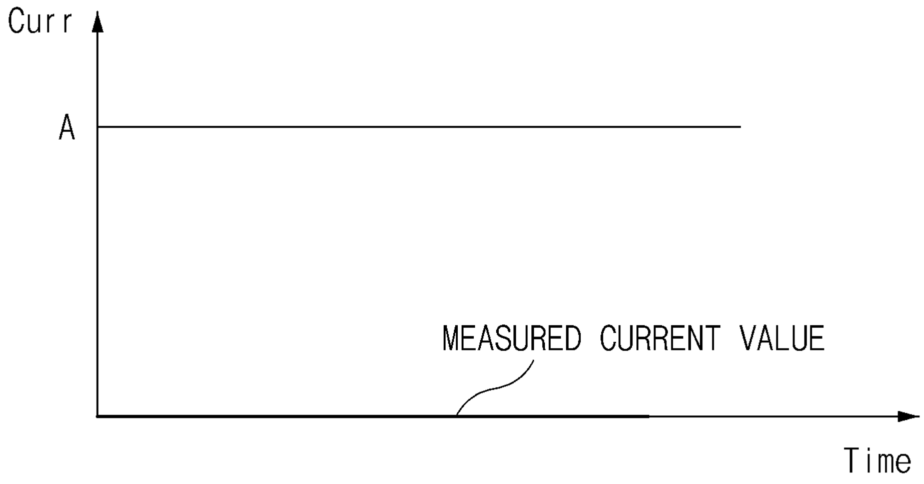

On the other hand, when determining that the plurality of current values measured during the predetermined duration have not reached the preset maximum value, the controller 150 may determine that the plurality of sound output devices are in a failure state. A more detailed description will be made with reference to FIGS. 5 and 6. FIGS. 5 and 6 are graphs illustrating a current when a failure occurs in a virtual engine sound control device according to an embodiment of the present disclosure.

As shown in FIGS. 5 and 6, when measured current values have not reached a preset maximum value A, the controller 150 may determine that the sound output device is in the failure state.

When there is a current value that has not reached the preset maximum value among the current values respectively measured from the plurality of sound output devices, the controller 150 may determine that a sound output device from which the current value that has not reached the maximum value is measured is in the failure state. A more detailed description will be made with reference to FIG. 7.

Figure 7:
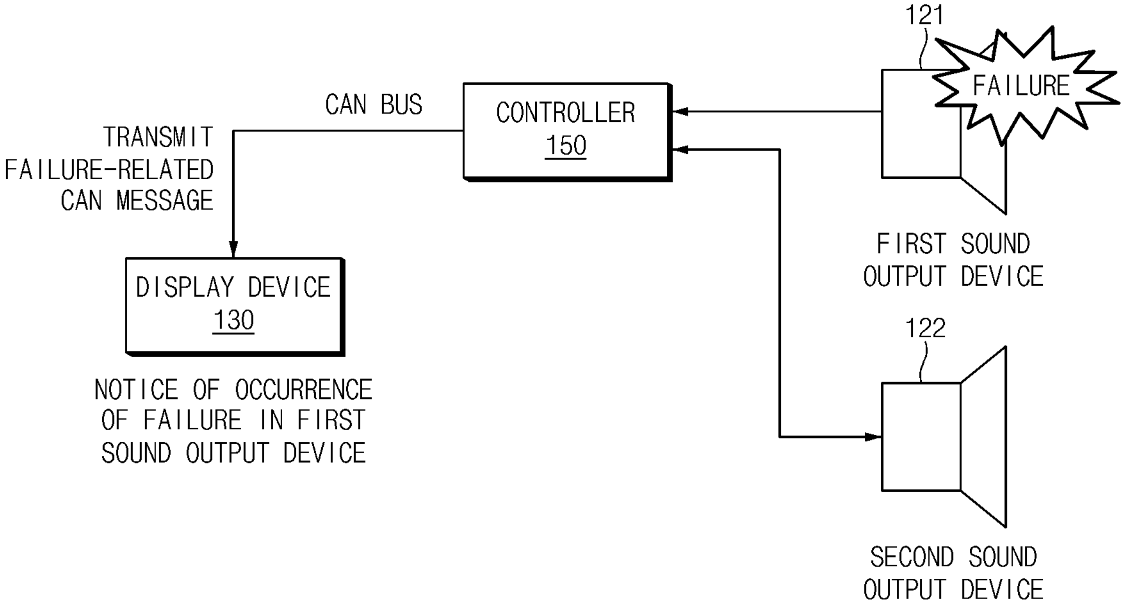
FIG. 7 is a view schematically illustrating an operation of a controller when a failure occurs in a virtual engine sound control device according to an embodiment of the present disclosure.

FIG. 7 is a view schematically illustrating an operation of a controller when a failure occurs in a virtual engine sound control device according to an embodiment of the present disclosure.

As shown in FIG. 7, when determining that the current value output from the first voice coil 121*a* of the first sound output device 121 among the current value output from the first voice coil 121*a* of the first sound output device 121 and the current value output from the second voice coil 122*a* of the second sound output device 122 during the predetermined duration has not reached the preset maximum value, the controller 150 may determine that the first sound output device 121 is in the failure state.

The controller 150 may generate a CAN message indicating that the first sound output device 121 is in the failure state and transmit the CAN message to the display device 130, and the display device 130 may output an image indicating that the failure has occurred in the first sound output device. A more detailed description will be made with reference to FIG. 8.

Figure 8:
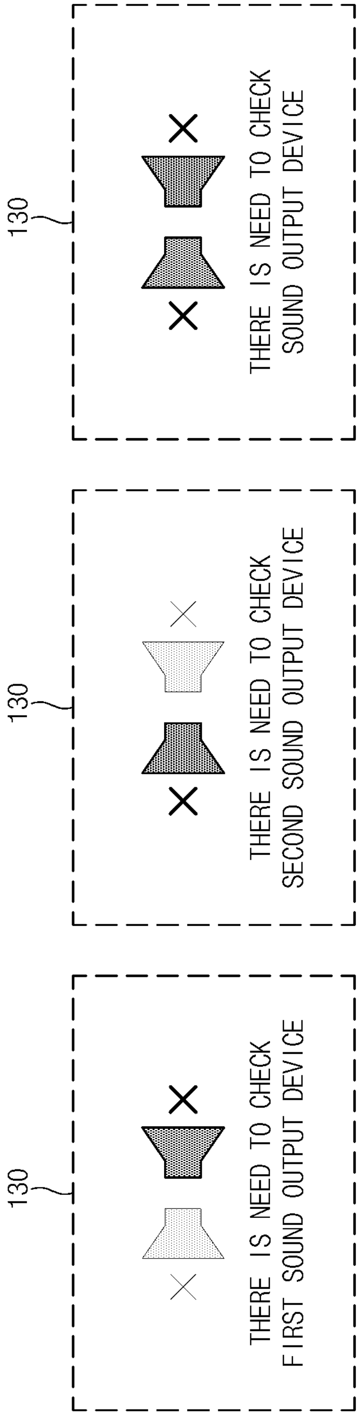
FIG. 8 is a view illustrating an image output when an error occurs in a virtual engine sound control device according to an embodiment of the present disclosure.

FIG. 8 is a view illustrating an image output when an error occurs in a virtual engine sound control device according to an embodiment of the present disclosure.

As shown in FIG. 8, the controller 150 may generate images of the states of the plurality of output devices, and output the images. According to an embodiment, the controller 150 may output a sound output device determined to be in the failure state and a sound output device not determined to be in the failure state via the display device 130 in a manner capable of being intuitively recognized by the user.

As an example, when determining that the first sound output device 121 is in the failure state and the second sound output device 122 is not in the failure state, the controller 150 may output an image indicating whether the first sound output device 121 is unavailable in a deep color, output an image indicating whether the second sound output device 122 is unavailable in a light color, and output a message indicating that the first sound output device 121 is unavailable (there is a need to check the first sound output device) via the display device 130 together.

In addition, when determining that the first sound output device 121 is not in the failure state and the second sound output device 122 is in the failure state, the controller 150 may output the image indicating whether the first sound output device 121 is unavailable in the light color, output the image indicating whether the second sound output device 122 is unavailable in the deep color, and output a message indicating that the second sound output device 122 is unavailable (there is a need to check the second sound output device) via the display device 130 together.

In addition, when determining that the first sound output device 121 is in the failure state and the second sound output device 122 is in the failure state, the controller 150 may output both the image indicating whether the first sound output device 121 is unavailable and the image indicating whether the second sound output device 122 is unavailable in the deep color, and output a message indicating that the sound output device 120 is unavailable (there is a need to check the sound output device) via the display device 130 together.

Figure 9:
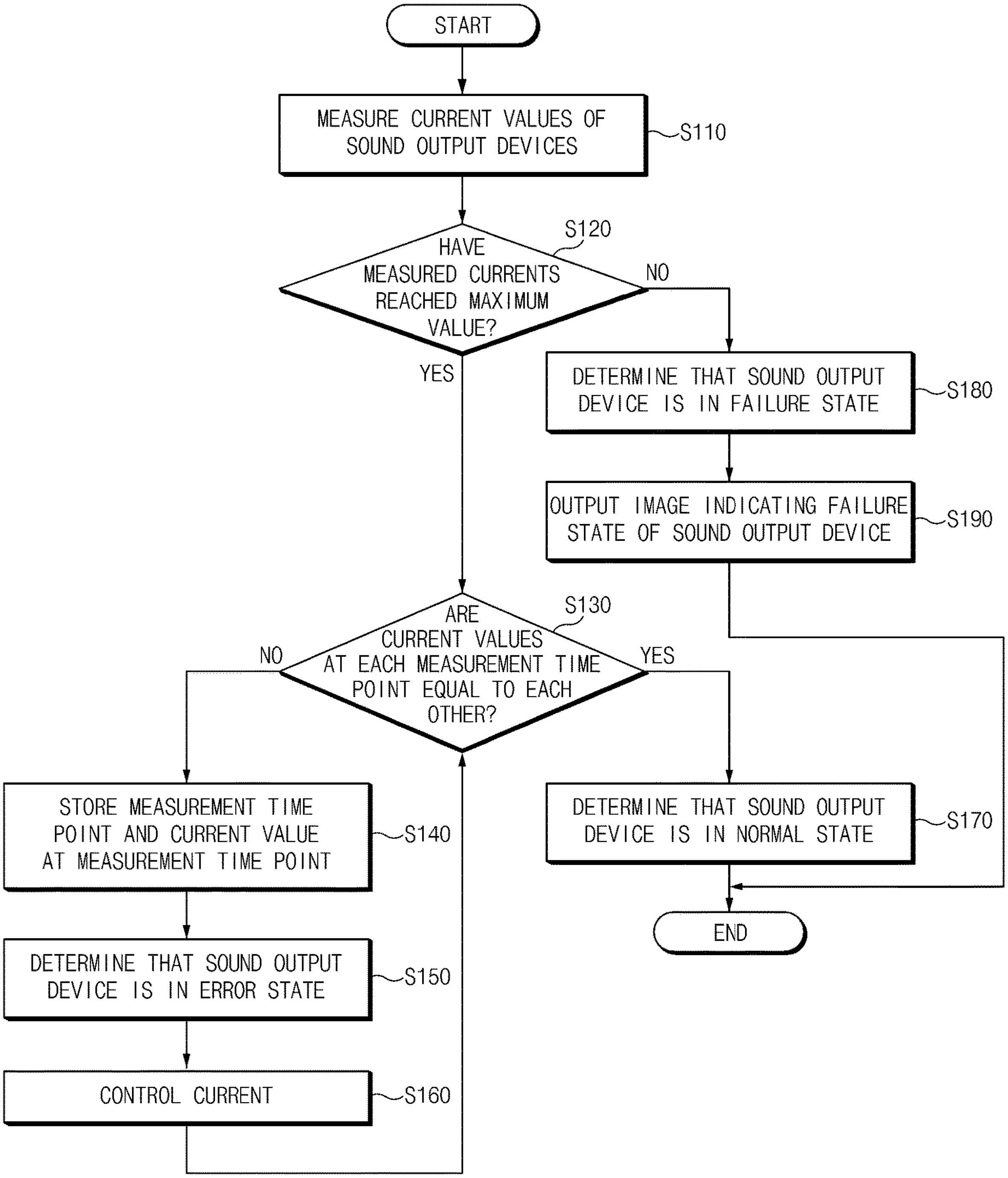
FIG. 9 is a flowchart illustrating a virtual engine sound control method according to an embodiment of the present disclosure.

FIG. 9 is a flowchart illustrating a virtual engine sound control method according to an embodiment of the present disclosure.

As shown in FIG. 9, the controller 150 may measure the current values of the one or more sound output devices (S110). According to an embodiment, in S110, the controller 150 may measure the current output from the first voice coil 121*a* included in the first sound output device 121 and the current output from the second voice coil 122*a* included in the second sound output device 122.

The controller 150 may determine whether the plurality of current values measured during the predetermined duration have reached the preset maximum value (S120). According to an embodiment, in S120, the controller 150 may determine whether each of the current value output from the first voice coil 121*a* and the current value output from the second voice coil 122*a* has reached the preset maximum value during the predetermined duration.

When determining that each of the current value output from the first voice coil 121*a* and the current value output from the second voice coil 122*a* has reached the preset maximum value during the predetermined duration, the controller 150 may compare the current values with each other at each measurement time point, and determine whether the current values at each measurement time point are equal to each other (S130).

When determining in S130 that the current value measured from the first voice coil 121*a* of the first sound output device 121 and the current value measured from the second voice coil 122*a* of the second sound output device 122 at each measurement time point are equal to each other (Yes), the controller 150 may determine that the first sound output device 121 and the second sound output device 122 are in the normal state (S170).

On the other hand, when determining in S130 that the current value measured from the first voice coil 121*a* of the first sound output device 121 and the current value measured from the second voice coil 122*a* of the second sound output device 122 at each measurement time point are not equal to each other (No), the controller 150 may control the time point at which it is determined that the current value measured from the first voice coil 121*a* of the first sound output device 121 is not equal to the current value measured from the second voice coil 122*a* of the second sound output device 122, and the current value measured from the second sound output device 122 at the time point to be stored (S140).

The controller 150 may determine the sound output device in which the error has occurred among the one or more sound output devices (S150). According to an embodiment, in S150, the controller 150 may determine the sound output device having the current value in which the waveform of one cycle is repeated as the reference sound output device, and may determine that the sound output device from which the current value different from the current value of the reference sound output device is measured is in the error state.

The controller 150 may control the current of the second sound output device 122 determined to be in the error state (S160). According to an embodiment, in S160, the controller 150 may control the current value B of the fourth time point to be output via the second sound output device 122 from the time point (the fourth time point in FIG. 4) at which it is determined that the current value measured from the first sound output device 121 is not equal to the current value measured from the second sound output device 122 to the time point (the fifth time point in FIG. 4) at which the current value of the reference sound output device becomes equal to the current value B of the fourth time point.

On the other hand, when determining in S120 that the plurality of current values measured during the predetermined duration have not reached the preset maximum value (No), the controller 150 may determine that the plurality of sound output devices are in the failure state (S180).

When determining that the plurality of sound output devices 121 are in the failure state, the controller 150 may generate the CAN message and transmit the CAN message to the display device 130 to control the display device 130 to output the image indicating that the failure has occurred in the sound output device (S190).

Figure 10:
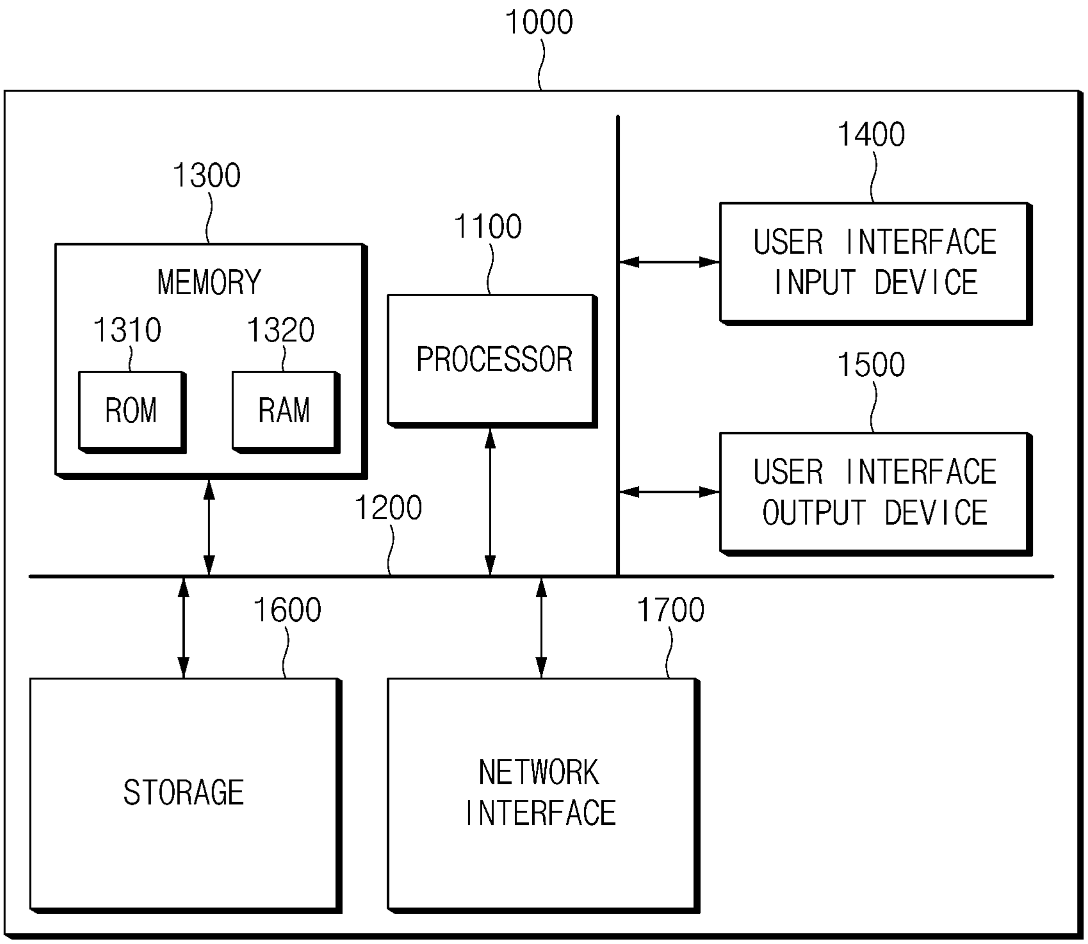
FIG. 10 is a view illustrating a configuration of a computing system executing a method according to an embodiment of the present disclosure.

FIG. 10 is a view illustrating a configuration of a computing system executing a method according to an embodiment of the present disclosure.

With reference to FIG. 10, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the virtual engine sound according to an embodiment of the present disclosure may minimize the sense of heterogeneity of the sound output and reduce the cost.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a virtual engine sound, the device comprising: a sensor for sensing a state of a vehicle; one or more sound output devices for outputting a virtual engine sound corresponding to the state of the vehicle; and a controller configured to: measure a plurality of current values respectively output from the one or more sound output devices; and determine operating states of the one or more sound output devices based on the measured plurality of current values, wherein the controller determines that a sound output device among the one or more sound output devices is in error state, and controls current of the sound output device determined to be in error state.

2. The device of claim 1, wherein the controller is configured to determine whether the plurality of current values measured during a predetermined duration have reached a preset maximum value.

3. The device of claim 2, wherein in response to determination that a current value among the plurality of current values measured during the predetermined duration has not reached the preset maximum value, the controller is configured to determine that a sound output device of the one or more sound output devices where the current value that has not reached the maximum value is measured is in a failure state.

4. The device of claim 3, wherein the controller is configured to output an image indicating that the sound output device is in the failure state on a display device.

5. The device of claim 2, wherein in response to determination that the plurality of current values measured during the predetermined duration have reached the preset maximum value, the controller is configured to compare the plurality of current values with each other at each measurement time point, and determine whether the plurality of current values are equal to each other at each measurement time point.

6. The device of claim 5, wherein in response to determination that the plurality of current values are not equal to each other at each measurement time point, the controller is configured to determine a sound output device among the one or more sound output devices having a first current value with a waveform of one cycle repeated as a reference sound output device, and determine that at least one sound output device of the one or more sound output devices having a measured current value different from the first current value of the reference sound output device is in an error state.

7. The device of claim 6, wherein in response to determination that the plurality of current values are not equal to each other at each measurement time point, the controller is configured to store a first time point when the plurality of current values are not equal to each other, and at least one current value measured at the first time point of the at least one sound output device in the error state.

8. The device of claim 7, wherein the controller is configured to control the at least one current value measured at the first time point to be output to the at least one sound output device in the error state from the first time point to a second time point, wherein a second current value of the reference sound output device measured at the second time point becomes equal to the at least one current value measured at the first time point of the at least one sound output device.

9. The device of claim 5, wherein in response to determination that the plurality of current values are equal to each other at each measurement time point, the controller is configured to determine that the one or more sound output devices are in a normal state.

10. A method for controlling a virtual engine sound, the method comprising:
- measuring a plurality of currents output from one or more sound output devices;
- determining operating states of the one or more sound output devices based on the measured plurality of current values;
- determining that a sound output device among the one or more sound output devices is in error state; and
- controlling current of the sound output device determined to be in error state.

11. The method of claim 10, further comprising:
- determining whether the plurality of current values measured during a predetermined duration have reached a preset maximum value.

12. The method of claim 11, further comprising:
- in response to determination that a current value among the plurality of current values measured during the predetermined duration has not reached the preset maximum value, determining that a sound output device of the one or more sound output devices where the current value that has not reached the maximum value is measured is in a failure state.

13. The method of claim 12, further comprising:
- outputting an image indicating that the sound output device is in the failure state on a display device.

14. The method of claim 11, further comprising:
- in response to determination that the plurality of current values measured during the predetermined duration have reached the preset maximum value, comparing the plurality of current values with each other at each measurement time point, and determining whether the plurality of current values are equal to each other at each measurement time point.

15. The method of claim 14, further comprising:
- in response to determination that the plurality of current values are not equal to each other at each measurement time point, determining a sound output device among the one or more sound output devices having a first current value with a waveform of one cycle repeated as a reference sound output device, and determining that at least one sound output device of the one or more sound output devices having a measured current value different from the first current value of the reference sound output device is in an error state.

16. The method of claim 15, further comprising:
- in response to determination that the plurality of current values are not equal to each other at each measurement time point, storing a first time point when the plurality of current values are not equal to each other, and at least one current value measured at the first time point of the at least one sound output device in the error state.

17. The method of claim 16, further comprising:
- controlling the at least one current value measured at the first time point to be output to the at least one sound output device in the error state from the first time point to a second time point, wherein a second current value of the reference sound output device measured at the second time point becomes equal to the at least one current value measured at the first time point of the at least one sound output device.

18. The method of claim 14, further comprising:
- in response to determination that the plurality of current values of the sound output devices are equal to each other at each measurement time point, determining that the one or more sound output devices are in a normal state.

* * * * *